(12) United States Patent
Bowers et al.

(10) Patent No.: US 6,168,190 B1
(45) Date of Patent: Jan. 2, 2001

(54) TRUCK OCCUPANT RESTRAINT APPARATUS

(75) Inventors: Paul A. Bowers, Ray; Barney J. Bauer, Fenton, both of MI (US)

(73) Assignee: TRW Vehicle Safety Systems Inc., Lyndhurst, OH (US)

( * ) Notice: Under 35 U.S.C. 154(b), the term of this patent shall be extended for 0 days.

(21) Appl. No.: 09/133,170

(22) Filed: Aug. 12, 1998

(51) Int. Cl.$^7$ .................................................. B60R 21/22
(52) U.S. Cl. ........................................................ 280/730.2
(58) Field of Search ............................ 280/730.2, 730.1, 280/728.1, 748, 751

(56) References Cited

U.S. PATENT DOCUMENTS

| | | |
|---|---|---|
| 2,806,737 | 9/1957 | Maxwell . |
| 2,834,606 | 5/1958 | Bertrand . |
| 2,860,003 | 11/1958 | Hodges . |
| 3,397,911 | 8/1968 | Brosius, Sr. . |
| 3,510,150 | 5/1970 | Wilfert . |
| 3,655,217 | 4/1972 | Johnson . |
| 3,703,313 | 11/1972 | Schiesterl et al. . |
| 4,249,754 | 2/1981 | Best . |
| 4,828,287 | 5/1989 | Siler . |
| 4,966,388 | 10/1990 | Warner et al. . |
| 5,322,322 | 6/1994 | Bark et al. . |
| 5,362,097 | * 11/1994 | Barske ................................ 280/730 R |
| 5,470,103 | * 11/1995 | Vaillancourt et al. ............... 280/730.1 |
| 5,480,181 | 1/1996 | Bark et al. . |
| 5,556,124 | * 9/1996 | Olson .................................... 280/728.2 |
| 5,833,312 | * 11/1998 | Lenz .................................... 297/216.13 |
| 5,921,575 | * 7/1999 | Kretschmer et al. ................. 280/728.2 |

FOREIGN PATENT DOCUMENTS

| | | |
|---|---|---|
| 2841729 | 4/1980 | (DE) . |
| 2297950 | 8/1996 | (GB) . |
| 538993 | 2/1993 | (JP) . |

* cited by examiner

Primary Examiner—Brian L. Johnson
Assistant Examiner—Tony Winner
(74) Attorney, Agent, or Firm—Tarolli, Sundheim, Covell, Tummino & Szabo L.L.P

(57) ABSTRACT

An apparatus includes a truck cab (12), a seat (22) for an occupant of the truck cab (12), and an inflatable vehicle occupant protection device (34). The seat (22) includes a seat back (24) with an upper end (26) adjacent to the rear wall (16) of the truck cab (12). The protection device (34) is inflatable to a deployed condition adjoining the rear wall (16) of the truck cab (12) above the upper end (26) of the seat back (24) so as to transmit crash forces from the occupant's head to the rear wall (16) of the truck cab (12). In this manner, the protection device (34) and the rear wall (16) of the truck cab (12) together provide crash reaction forces that restrain movement of the occupant's head toward the rear wall (16) of the truck cab (12).

9 Claims, 3 Drawing Sheets

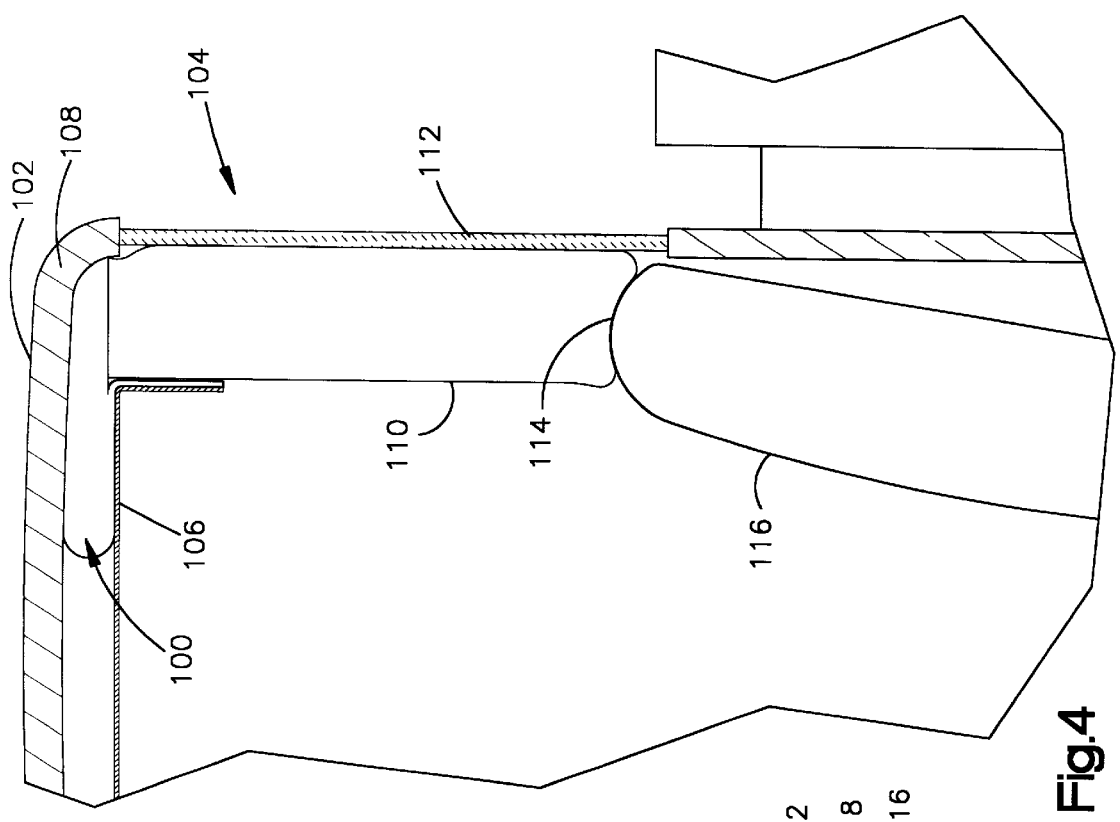
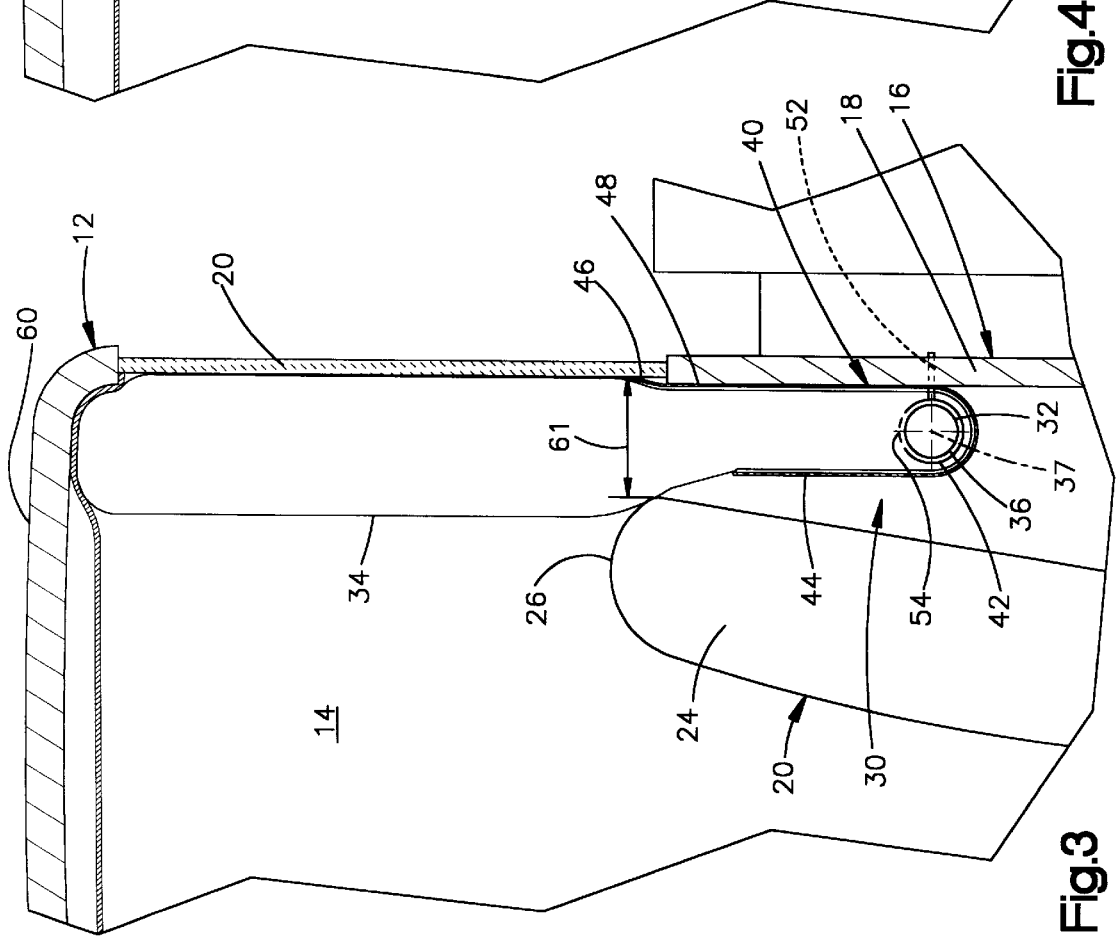

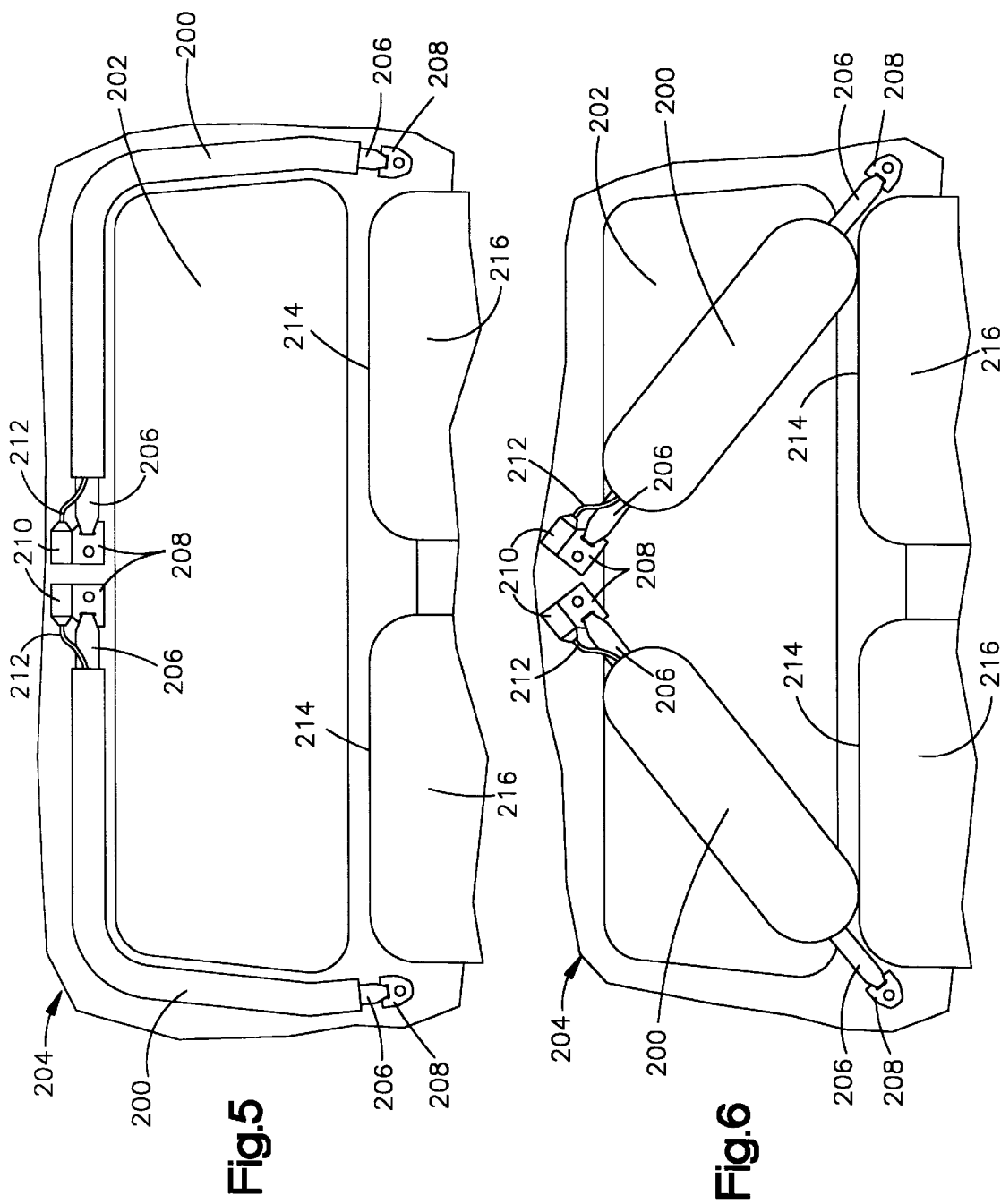

TRUCK OCCUPANT RESTRAINT APPARATUS

FIELD OF THE INVENTION

The present invention relates to an apparatus for restraining an occupant of a truck seat upon the occurrence of a crash.

BACKGROUND OF THE INVENTION

Crash forces may urge an occupant of a truck seat to move in a rearward direction relative to the seat. This may cause the occupant's head to move toward and against the rear wall of the truck cab.

SUMMARY OF THE INVENTION

In accordance with the present invention, an apparatus comprises a truck cab, a seat for an occupant of the truck cab, and an inflatable vehicle occupant protection device. The seat includes a seat back with an upper end adjacent to the rear wall of the truck cab. The protection device is inflatable to a deployed condition adjoining the rear wall of the truck cab above the upper end of the seat back. When the protection device is in the deployed condition, it transmits crash forces from the occupant's head to the rear wall of the truck cab upon engagement of the occupant's head with the protection device. In this manner, the protection device and the rear wall of the truck cab together provide crash reaction forces that restrain movement of the occupant's head toward the rear wall of the truck cab.

BRIEF DESCRIPTION OF THE DRAWINGS

The foregoing and other features of the present invention will become apparent to one skilled in the art to which the present invention relates upon reading the following description of the invention with reference to the accompanying drawings, wherein:

FIG. 3 is a view similar to FIG. 2 showing parts in different positions;

FIG. 4 is a view similar to FIG. 3 showing parts of an apparatus comprising a second embodiment of the present invention; and FIGS. 5 and 6 are front views of parts of an apparatus comprising a third embodiment of the present invention.

DESCRIPTION OF PREFERRED EMBODIMENTS

Figure 1:
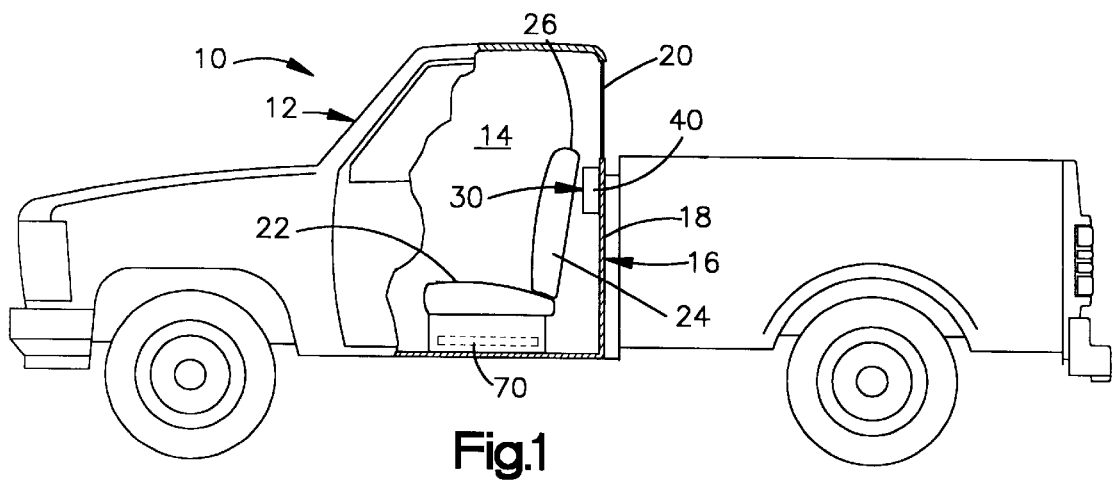
FIG. 1 is a side view of a truck comprising a first embodiment of the present invention, with certain parts being shown schematically.

A truck 10 comprising a first embodiment of the present invention is shown in FIG. 1. The truck 10 has a cab 12 defining an occupant compartment 14. A rear wall 16 of the cab 12 is defined in part by a structural wall panel 18 and in part by a rear window 20. A bench seat 22 in the occupant compartment 14 has a seat back 24 with an upper end 26 adjacent to the rear window 20. When the truck 10 experiences a crash, crash forces that are imparted to an occupant of the seat 22 may cause the occupant's head to move rearwardly relative to the upper end 26 of the seat back 24. In accordance with the present invention, the cab 12 is equipped with an occupant protection apparatus 30 which is actuatable to restrain such movement of an occupant's head, and thereby to help protect the occupant's head from a forceful impact with the rear window 20.

Figure 2:
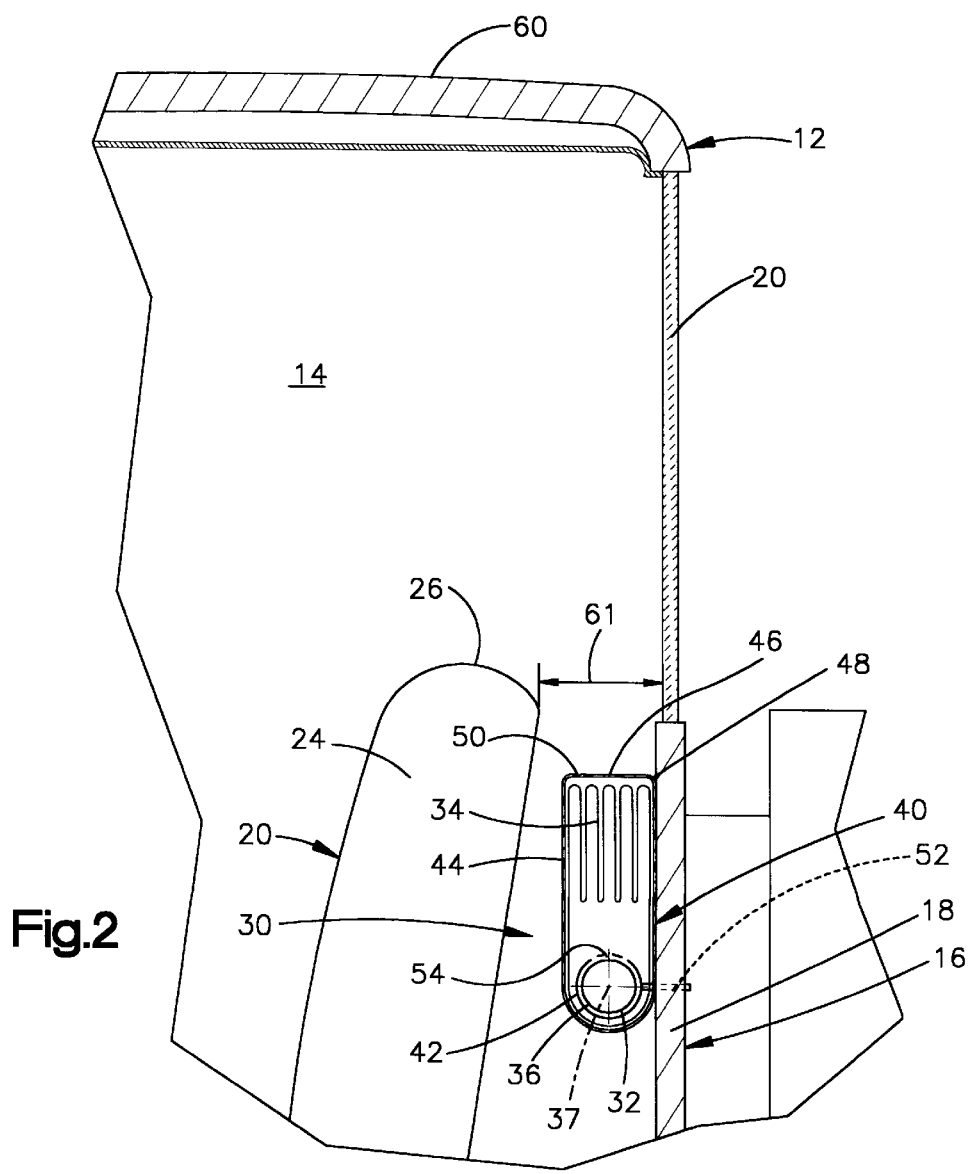
FIG. 2 is an enlarged partial view of parts of the first embodiment.

As shown in FIGS. 2 and 3, the occupant protection apparatus 30 includes an inflator 32 and a particular type of inflatable vehicle occupant protection device 34 which is known as an air bag. The inflator 32 has a cylindrical housing 36 containing a source of inflation fluid for inflating the air bag 34. As known in the art, the source of inflation fluid may comprise pressurized inflation fluid, a body of ignitable gas generating material, or a combination of pressurized inflation fluid and ignitable material for heating the inflation fluid.

The air bag 34 is constructed of one or more panels of a known air bag material. Such materials include woven materials and plastic films. The panels of air bag material are interconnected along seams that are formed by stitches, ultrasonic welds, adhesives, heat staking, or the like, depending on the particular air bag material of which the panels are formed. Preferably, the air bag 34 is constructed of panels formed of nylon fabric which is coated with silicone. Any suitable arrangement of folds can be used to place the air bag 34 in the folded, uninflated condition in which it is shown in FIG. 2.

The inflator 32 and the air bag 34 in the first embodiment of the present invention are parts of an air bag module 40 which is assembled separately from the truck cab 12 and the seat 22. Other parts of the module 40 include a diffuser 42 and a plastic cover 44. The inflator 32 is received within the diffuser 42. The cover 44 encloses the air bag 34, the diffuser 42, and the inflator 32. An upper end portion of the cover 44 defines a deployment door 46 which is bounded by a hinge 48 and a tear seam 50. A plurality of fasteners 52 (one of which is shown in FIGS. 2 and 3) project from the diffuser 42 to the structural panel 18 at the rear wall 16 of the cab 12 to fasten the module 40 to the rear wall 16 of the cab 12.

The truck 10 may experience a crash for which inflation of the air bag 34 is desired to help protect an occupant of the seat 22. The inflator 32 is then actuated in a known manner and rapidly emits a large quantity of inflation fluid. The diffuser 42 has an array of outlet openings 54 which direct the inflation fluid to flow from the inflator 32 into the air bag 34 to inflate the air bag 34. As the inflation fluid emerging from the diffuser 42 begins to inflate the air bag 34, it moves the air bag 34 against the deployment door 46 at the upper end of the cover 44. The inflation fluid pressure forces acting on the air bag 34 rupture the cover 44 at the tear seam 50 and move the deployment door 46 pivotally about the hinge 48 from the closed position of FIG. 2 to the open position of FIG. 3.

As the inflation fluid continues to inflate the air bag 34, it moves the air bag 34 upward from the module 40 behind the head and neck of an occupant of the seat 22. More specifically, the air bag 34 is deployed to a position in which it adjoins the rear window 20 throughout the full height of the rear window 20 above the upper end 26 of the seat back 24, as shown in FIG. 3. The air bag 34 can then transmit crash forces from the occupant's head to the rear window 20 upon engagement of the occupant's head with the air bag 34. The inflation fluid pressure forces in the air bag 34 then act between the rear window 20 and the occupant's head, and thus act as crash reaction forces that restrain movement of the occupant's head toward the rear window 20.

Preferably, the fully deployed air bag 34 extends vertically to the roof 60 of the cab 12, and also extends horizontally across the entire width of the rear wall 16 between opposite sides of the cab 12 for protection of two or more occupants of the seat 22. One or more sliding track assemblies (not shown) could be used to guide the periphery of the air bag 34 to the fully deployed condition. Such guide track assemblies could be mounted on the rear wall 18, on the roof 60, and/or on rear window pillars (not shown). The air bag 34 could then transmit crash forces from an occupant's head to the sliding track assemblies as well as to the rear window 20 upon engagement of the occupant's head with the air bag 34. This would reduce the crash force load applied to the rear window.

In accordance with a particular feature of the present invention, the module 40 in the first embodiment is mounted on the rear wall 16 of the truck cab 12 at a location below the upper end 26 of the seat back 24. When the air bag 34 is being inflated, it moves upward from the module 40 through a gap 61 defined by and between the rear wall 16 and the upper end 26 of the seat back 24. In accordance with this feature of the invention, a horizontally adjustable seat track assembly 70 (shown schematically in FIG. 1) supports the seat 22 for fore and aft movement in the cab 12, but limits aft movement of the seat 22 such that the gap 61 remains open for deployment of the air bag 34 upward through the gap 61.

A second embodiment of the present invention is shown partially in FIG. 4. The second embodiment includes an air bag module 100 which is mounted in the roof 102 of a truck cab 104 between the headliner 106 and the structural roof panel 108. The module 100 includes an air bag 110 which, as shown in FIG. 4, is inflatable to a deployed condition adjoining the rear window 112 of the cab 104 above the upper end 114 of an adjacent seat back 116. However, the air bag 110 in the second embodiment is deployed from above the rear window 112 rather than from below the rear window 112. Therefore, it is not necessary to provide the cab 104 in the second embodiment with a gap like the gap 61 (FIGS. 2 and 3) in the first embodiment. Alternatively, an air bag like the air bag 110 could be deployed across the rear window 112 in a sideways direction from a pillar at either side of the cab 104. Such air bags could be guided by sliding track assemblies in the same manner as described above with reference to the first embodiment.

A third embodiment of the present invention is shown in FIGS. 5 and 6. The third embodiment includes a pair of alternative inflatable vehicle occupant protection devices 200. Each protection device 200 in the third embodiment is a tubular structure extending partially around the rear window 202 of a truck cab 204. Attachment straps 206 connect the protection devices 200 to pivotal mounting fixtures 208 at the opposite ends of the protection devices 200. Such protection devices are preferably constructed as shown in U.S. Pat. No. 5,322,322 or U.S. Pat. No. 5,480,181. Any suitable roof trim, wall trim, or pillar trim structure can be used to conceal the protection devices 200 from view in the cab 204.

A gas generator 210 is provided for each protection device 200. Each gas generator 210 is mounted on a pivotal mounting fixture 208 at one end of the corresponding protection device 200 and communicates with the protection device 200 through thermally resistant tubing 212. When the gas generators 210 are actuated, the gas flowing into the protection devices 200 increases their diameters and decreases their lengths. The protection devices 200 are thus inflated and deployed pivotally from the positions of FIG. 5 to the positions of FIG. 6. Each protection device 200 then adjoins the rear window 202 above the upper end 214 of an adjacent seat 216 in the cab 204.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
   a truck cab having a rear wall;
   a seat for an occupant of said truck cab, said seat including a seat back having an upper end adjacent to said rear wall of said truck cab; and
   an inflatable vehicle occupant protection device inflatable to a deployed condition in which said protection device adjoins said rear wall of said truck cab above said upper end of said seat back so as to transmit crash forces from the occupant's head to said rear wall of said truck cab, whereby said protection device and said rear wall of said truck cab together provide crash reaction forces that restrain movement of the occupant's head toward said rear wall of said truck cab, and
   wherein said seat back is spaced from said rear wall of said truck cab to define a gap between said upper end of said seat back and said rear wall of said truck cab, said inflatable vehicle occupant protection device being stored beneath said gap and being deployable upward through said gap.

2. Apparatus as defined in claim 1 further comprising a horizontally adjustable seat track assembly which limits aft movement of said seat such that said gap remains open for deployment of said inflatable vehicle occupant protection device upward through said gap.

3. Apparatus as defined in claim 1 wherein said inflatable vehicle occupant protection device is entirely separate from said seat back.

4. Apparatus as defined in claim 1 wherein said inflatable vehicle occupant protection device is mounted on said rear wall of said truck cab.

5. Apparatus as defined in claim 4 wherein said rear wall of said truck cab includes a rear window, said inflatable vehicle occupant protection device adjoining said rear window when in said deployed condition.

6. Apparatus as defined in claim 5 wherein said inflatable vehicle occupant protection device is an air bag.

7. Apparatus comprising:
   a truck cab having a rear wall;
   a seat for an occupant of said truck cab, said seat including a seat back having an upper end adjacent to said rear wall of said truck cab; and
   an inflatable vehicle occupant protection device inflatable from a deflated condition to a deployed condition in which said protection device adjoins said rear wall of said truck cab above said upper end of said seat back so as to transmit crash forces from the occupant's head to said rear wall of said truck cab, whereby said protection device and said rear wall of said truck cab together provide crash reaction forces that restrain movement of the occupant's head toward said rear wall of said truck cab,
   said vehicle occupant protection device when in said deflated condition being supported at a location spaced away from said seat back.

8. Apparatus as defined in claim 7 wherein said truck cab has a roof, said roof having a headliner and a structural roof panel, said inflatable vehicle occupant protection device being stored between said headliner and said structural roof panel and being deployable downward towards said upper end of said seat back.

9. Apparatus as defined in claim 7 wherein said inflatable vehicle occupant protection device is a pair of alternative inflatable vehicle occupant protection devices which have a tubular structure and which extend partially around said rear wall of said truck cab when in said deflated condition.

* * * * *